US010009830B2

(12) United States Patent
Keller et al.

(10) Patent No.: US 10,009,830 B2
(45) Date of Patent: Jun. 26, 2018

(54) ACCESS INFORMATION HANDLING IN A MOBILE NETWORK WITH CELLULAR NETWORK ACCESSES AND WIRELESS LOCAL AREA NETWORK ACCESSES

(71) Applicant: Telefonaktiebolaget LM Ericsson (publ), Stockholm (SE)

(72) Inventors: Ralf Keller, Würselen (DE); Afshin Abtin, Sollentuna (SE); Magnus Hallenståhl, Täby (SE); Stefan Rommer, Västra Frölunda (SE)

(73) Assignee: TELEFONAKTIEBOLAGET L M ERICSSON (publ), Stockholm (SE)

( * ) Notice: Subject to any disclaimer, the term of this patent is extended or adjusted under 35 U.S.C. 154(b) by 5 days.

(21) Appl. No.: 14/899,302

(22) PCT Filed: Jun. 17, 2013

(86) PCT No.: PCT/EP2013/062543
§ 371 (c)(1),
(2) Date: Dec. 17, 2015

(87) PCT Pub. No.: WO2014/202117
PCT Pub. Date: Dec. 24, 2014

(65) Prior Publication Data
US 2016/0165518 A1 Jun. 9, 2016

(51) Int. Cl.
*H04W 48/04* (2009.01)
*H04W 48/08* (2009.01)
(Continued)

(52) U.S. Cl.
CPC ......... *H04W 48/08* (2013.01); *H04L 65/1016* (2013.01); *H04L 65/1066* (2013.01);
(Continued)

(58) Field of Classification Search
CPC . H04W 84/12; H04W 12/06; H04W 36/0022; H04W 48/08; H04W 60/04;
(Continued)

(56) References Cited

U.S. PATENT DOCUMENTS

| 2008/0095070 | A1* | 4/2008 | Chan ................... H04L 63/0272 370/254 |
| 2010/0246441 | A1* | 9/2010 | Jung ....................... H04L 63/00 370/254 |
| 2012/0163344 | A1* | 6/2012 | Bakthavathsalu .... H04W 36/00 370/332 |

FOREIGN PATENT DOCUMENTS

| WO | WO 2011/000672 A1 | 1/2011 |
| WO | WO 2011/072747 A1 | 6/2011 |
| WO | WO 2012/113842 A1 | 8/2012 |

OTHER PUBLICATIONS

International Search Report and Written Opinion of the International Searching Authority, Application No. PCT/EP2013/062543, dated Jun. 3, 2014.
(Continued)

*Primary Examiner* — Quan M Hua
(74) *Attorney, Agent, or Firm* — Sage Patent Group

(57) ABSTRACT

A first network node controls WLAN accesses and a second network node controls cellular network accesses. The first network node (NN) records a time of a last radio contact event of a user equipment (UE) with respect to a WLAN access controlled by the first NN. In response to a request from a third NN, the first NN indicates the recorded time of the last radio contact event to the third NN. The second NN records a time of a last radio contact event of the UE with respect to a cellular network access controlled by the second NN. In response to a request from the third NN, the second NN indicates the recorded time of the last radio contact event to the third NN. The third NN can use the indicated
(Continued)

times to determine whether the UE is attached to a WLAN access or to a cellular network access.

14 Claims, 11 Drawing Sheets

(51) Int. Cl.
*H04L 29/06* (2006.01)
*H04L 29/08* (2006.01)
*H04W 8/20* (2009.01)
*H04W 36/00* (2009.01)
*H04W 76/16* (2018.01)
*H04W 8/04* (2009.01)
*H04W 8/08* (2009.01)
*H04W 8/10* (2009.01)
*H04W 8/22* (2009.01)
*H04W 60/04* (2009.01)
*H04W 84/12* (2009.01)

(52) U.S. Cl.
CPC .......... *H04L 67/143* (2013.01); *H04W 8/205* (2013.01); *H04W 36/0022* (2013.01); *H04W 76/16* (2018.02); *H04W 8/04* (2013.01); *H04W 8/087* (2013.01); *H04W 8/10* (2013.01); *H04W 8/22* (2013.01); *H04W 60/04* (2013.01); *H04W 84/12* (2013.01)

(58) Field of Classification Search
CPC .. H04W 8/22; H04L 65/1016; H04L 65/1066; H04L 67/143
See application file for complete search history.

(56) References Cited

OTHER PUBLICATIONS

3GPP, Technical Specification, "3rd Generation Partnership Project; Technical Specification Group Services and System Aspects; Architectural requirements (Release 11)", 3GPP TS 23.221 V11.1.0 (Dec. 2012), 51 pp.

3GPP, Technical Specification, "3rd Generation Partnership Project; Technical Specification Group Services and System Aspects; IP Multimedia Subsystem (IMS) Service Continuity; Stage 2 (Release 12)", 3GPP TS 23.237 V12.3.0 (Jun. 2013), 172 pp.

3GPP, Technical Specification, "3rd Generation Partnership Project; Technical Specification Group Services and System Aspects; IP Multimedia Subsystem (IMS) centralized services; Stage 2 (Release 12)", 3GPP TS 23.292 V12.1.0 (Mar. 2013), 120 pp.

3GPP, Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.1.0 (Jun. 2013), 291 pp.

3GPP, Technical Specification, "3rd Generation Partnership Project; Technical Specification Group Services and System Aspects; Architecture enhancements for non-3GPP accesses (Release 12)", 3GPP TS 23.402 V12.0.0 (Mar. 2013), 253 pp.

3GPP, Technical Report, "3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12)", 3GPP TR 23.852 V12.0.0 (Sep. 2013), 27 pp.

GSM Association; "IMS Service Centralization and Continuity Guidelines", Version 6.0, Official Document IR.64, Feb. 28, 2013, 18 pp.

GSM Association; "IMS Profile for Voice and SMS", Version 7.0, Official Document IR.92, Mar. 3, 2013, 32 pp.

* cited by examiner

ACCESS INFORMATION HANDLING IN A MOBILE NETWORK WITH CELLULAR NETWORK ACCESSES AND WIRELESS LOCAL AREA NETWORK ACCESSES

CROSS REFERENCE TO RELATED APPLICATION

This application is a 35 U.S.C. § 371 national stage application of PCT International Application No. PCT/EP2013/062543, filed on Jun. 17, 2013, the disclosure and content of which is incorporated by reference herein in its entirety. The above-referenced PCT International Application was published in the English language as International Publication No. WO 2014/202117 A1 on Dec. 24, 2014.

TECHNICAL FIELD

The present invention relates to methods of controlling voice communication of a user equipment in a mobile network and to corresponding devices or systems.

BACKGROUND

Mobile networks are currently evolving from pure circuit switched (CS) networks towards packet switched (PS) networks, in particular Internet Protocol (IP) based networks, and by that integrate into IP based infrastructures that are also used for the Internet, the World Wide Web, and the datacom industry.

More specifically, technologies allowing voice communication over an IP based network have been introduced. Examples of such technologies are Voice over IP (VoIP) via Digital Subscriber Line (DSL) access or Voice over IP via Wireless Local Area Network (WLAN) access. Also in some mobile networks, technologies which allow voice communication over an IP based network are available. Examples of such mobile networks are mobile networks as specified by the $3^{rd}$ Generation Partnership Project (3GPP). For example, a mobile network may implement an IP Multimedia Subsystem (IMS) as specified in 3GPP Technical Specification (TS) 23.228 V12.0.0 and offer voice communication as an IMS service.

Further, a concept referred to as IMS Centralized Services (ICS) has been introduced which allow for utilizing IMS services over various types of access networks, including not only PS access networks, but also CS access networks. The ICS concept is for example specified in 3GPP TS 23.292 V12.1.0. Using the ICS concept, the IMS voice services may be available via various kinds of radio access technology (RAT), such as Global Systems for Mobile Communications (GSM), Wideband Code Division Multiplex (WCDMA), General Packet Radio Service (GPRS), Enhanced Data Rates for GSM Evolution (EDGE), Enhanced GPRS (EG-PRS), Universal Mobile Telecommunications System (UMTS), and High Speed Packet Access (HSPA). Voice communication with a user equipment (UE) which is connected to the mobile network via a CS access network may then be routed through the IMS.

For scenarios where IMS services are usable by a UE both via PS access networks and via CS access networks, a mechanism referred to as Terminating Access Domain Selection (T-ADS) was introduced to select between multiple possible access types for terminating a call to a UE. The T-ADS mechanism is for example specified in 3GPP TS 23.401 V12.0.0, 23.060 V12.0.0, and 23.292 V12.0.0. According to these specifications, T-ADS may be implemented by a Service Centralization and Continuity Application Server (SCC AS) as for example specified in 3GPP TS 23.237 V12.2.0. The T-ADS functionality of the SCC AS may apply various criteria for selecting between a CS access network or PS access network for terminating an incoming voice session. For example, the SCC AS may obtain capabilities of the most recently used PS access network, e.g., in the form of an "IMS voice over PS session supported indication" and current RAT type, from a subscriber database referred to as Home Subscriber Server (HSS).

In addition, It is known to integrate Wireless Local Area Network (WLAN) accesses (also referred to as WiFi accesses) into the mobile network infrastructure. Specifically, control functionalities for such WLAN accesses may be integrated in the core network of the mobile network. Such concepts are for example described in 3GPP TS 23.402 V12.0.0 and 3GPP Technical Report (TR) 23.852 V1.5.0.

If a UE is attached to the mobile network via such WLAN access and loses WLAN coverage, a handover to a cellular network access may be triggered by the UE. For example, the triggering of such handover may be governed by ANDSF (Access Network and Domain Selection Function) policies. The ANDSF is for example described in 3GPP TS 23.402. Such handover procedures are for example described in 3GPP TS 23.060, 23.401, and 23.402. The details of such procedure depend on the particular scenario.

For example, if the UE is not connected to a cellular network access when it loses WLAN coverage, and the UE wants to preserve its IP address when moving to the cellular network access, it may perform a so called "handover attach" in to the cellular network access. The handover attach is similar to a usual attach to the cellular network access, but indicates "handover" as the request type. The handover indication is forward to the Packet Data Network Gateway (PGW) used for the cellular network access. The PGW may then continue to use the IP address which was used over the WLAN access also for the cellular network access.

If the UE already has packet data network (PDN) connectivity via a cellular network access, it may in turn initiate establishment of a new PDN Connection via the cellular network access, which then uses the IP address which was also used for the WLAN access. Also in this case, the above-mentioned "handover" indication may be used to indicate that the IP address of the UE should be preserved.

The above mechanisms of preserving the IP address allow for using a single registration of the UE in the IMS, irrespective of the UE being on a WLAN access or on a cellular network access. However, certain IMS services may then not be aware whether the UE is on a WLAN access or on a cellular network access. For example, if an IMS voice call to the UE needs to be terminated, the T-ADS functionality of the SCC AS may not be able to determine whether the UE is on a WLAN access or on a cellular network access. Accordingly, such information cannot be used by the T-ADS functionality. Problems may then for example arise if termination of the IMS voice call over WLAN is not possible due to restrictions of the WLAN access or if such termination is not desirable for other reasons. Similar problems may also exist for other services provided to the UE.

Accordingly, there is a need for techniques which allow for efficiently controlling communication of a UE in a mobile network.

SUMMARY

According to an embodiment of the invention, a method for controlling communication of a UE in a mobile network is provided. The mobile network is provided with at least one cellular network access and at least one WLAN access. According to the method, a network node records a time of a last radio contact event of the UE with respect to a WLAN access controlled by the network node. In response to a request from a further network node, the network node indicates the recorded time of the last radio contact event to the further network node.

According to a further embodiment of the invention, a method for controlling communication of a UE in a mobile network is provided. The mobile network is provided with at least one cellular network access and at least one WLAN access. According to the method, a network node receives, from a first further network node, a time of a last radio contact event of the UE with respect to a WLAN access controlled by the first further network node. Further, the network node receives, from a second further network node, a time of a last radio contact event of the UE with respect to a cellular network access controlled by the second further network node. On the basis of the received times of the last radio contact event, the network node determines whether the UE is attached to a WLAN access or to a cellular network access.

According to a further embodiment of the invention, a method for controlling communication of a UE in a mobile network is provided. The mobile network is provided with at least one cellular network access and at least one WLAN access. According to the method, a network node receives, from a further network node, information concerning a WLAN access to which the UE is attached. On the basis of the received information, the network node controls at least one service provided to the UE.

According to a further embodiment of the invention, a network node for a mobile network is provided. The mobile network is provided with at least one cellular network access and at least one WLAN access. The network node comprises a first interface for controlling at least one WLAN access of the mobile network. Further, the network node comprises a second interface for interacting with a further network node of the mobile network. Further, the network node comprises at least one processor. The at least one processor is configured to record a time of a last radio contact event of a UE with respect to a WLAN access controlled by the network node. Further, the at least one processor is configured to indicate, in response to a request from the further network node, the recorded time of the last radio contact event to the further network node.

According to a further embodiment of the invention, a network node for a mobile network is provided. The mobile network is provided with at least one cellular network access and at least one WLAN access. The network node comprises a first interface for interacting with a first further network node which is responsible for controlling at least one WLAN access of the mobile network. Further, the network node comprises a second interface for interacting with a second further network node which is responsible for controlling at least one cellular network access of the mobile network. Further, the network node comprises at least one processor. The at least one processor is configured to receive, from the first further network node, a time of a last radio contact event of a UE with respect to a WLAN access controlled by the first further network node. Further, the at least one processor is configured to receive, from the second further network node, a time of last radio contact event of the UE with respect to a cellular network access controlled by the second further network node. Further, the at least one processor is configured to determine, on the basis of the received times of the last radio contact event, whether the UE is attached to a WLAN access or to a cellular network access.

According to a further embodiment of the invention, a network node for a mobile network is provided. The mobile network is provided with at least one cellular network access and at least one WLAN access. The network node comprises an interface for interacting with a further network node and at least one processor. The at least one processor is configured to receive, from the further network node, information concerning a WLAN access to which a UE is attached. Further, the at least one processor is configured to control, on the basis of the received information, at least one service provided to the UE.

According to a further embodiment of the invention, a system for a mobile network is provided. The mobile network is provided with at least one cellular network access and at least one WLAN access. The system comprises a first network node, a second network node, and a third network node. The first network node is configured to record a time of a last radio contact event of a UE with respect to a WLAN access controlled by the first network node. Further, the first network node is configured to indicate, in response to a request from the third network node, the recorded time of the last radio contact event to the third network node. The second network node is configured to record a time of a last radio contact event of the UE with respect to a cellular network access controlled by the second network node. Further, the second network node is configured to, in response to a request from the third network node, indicate the recorded time of the last radio contact event to the third network node. The third network node is configured to determine, on the basis of the indicated times of the last radio contact event, whether the UE is attached to a WLAN access or to a cellular network access. The system may further comprise a fourth network node. The third network node may then be configured to indicate, to the fourth network node, information concerning a WLAN access or cellular network access to which the UE is attached. The fourth network node may be configured to control, on the basis of the indicated information, at least one service provided to the UE.

According to a further embodiment of the invention, a computer program is provided. The computer program comprises program code to be executed by at least one processor of a network node of a mobile network. The mobile network is provided with at least one cellular network access and at least one WLAN access. Execution of the program code causes the network node to record a time of a last radio contact event of a UE with respect to a WLAN access controlled by the network node. Further, execution of the program code causes the network node to indicate, in response to a request from a further network node, the recorded time of the last radio contact event to the further network node.

According to a further embodiment of the invention, a computer program is provided. The computer program comprises program code to be executed by at least one processor of a network node of a mobile network. The mobile network is provided with at least one cellular network access and at least one WLAN access. Execution of the program code causes the network node to receive, from a first further network node, a time of a last radio contact event of a UE with respect to a WLAN access controlled by the first further network node. Further, Further, execution of the program code causes the network node to receive, from a second further network node, a time of last radio contact event of the UE with respect to a cellular network access controlled by the second further network node. Further, execution of the program code causes the network node to determine, on the basis of the received times of the last radio contact event, whether the UE is attached to a WLAN access or to a cellular network access.

According to a further embodiment of the invention, a computer program is provided. The computer program comprises program code to be executed by at least one processor of a network node of a mobile network. The mobile network is provided with at least one cellular network access and at least one WLAN access. Execution of the program code causes the network node to receive, from a further network node, information concerning a WLAN access to which a UE is attached. Further, execution of the program code causes the network node to control, on the basis of the received information, at least one service provided to the UE.

DETAILED DESCRIPTION OF EMBODIMENTS

In the following, the invention will be explained in more detail by referring to exemplary embodiments and to the accompanying drawings. The illustrated embodiments relate to controlling communication of a UE in a mobile network providing different types of PS access, in particular cellular network accesses and WLAN accesses. Additionally, also CS accesses may be provided. The cellular accesses may for example be based on LTE radio access technology and/or on 2G/3G access technology, e.g., GPRS, EGPRS, or UMTS, optionally in connection with HSPA. In the illustrated example, the WLAN accesses and the cellular network accesses may share common infrastructure for connecting to network based services, such as provided by an IMS of the mobile network. Such shared infrastructure may for example include gateways or access points. For example, the cellular network accesses may use one or more PGWs for establishing PDN connections, and also the WLAN accesses may use these PGWs for establishing PDN connections, e.g., by using the S2a or S2b interfaces to the PGW as described in 3GPP TS 23.402. However, it is to be understood that the concepts as described herein may also be applied in other types of mobile networks.

Figure 1:
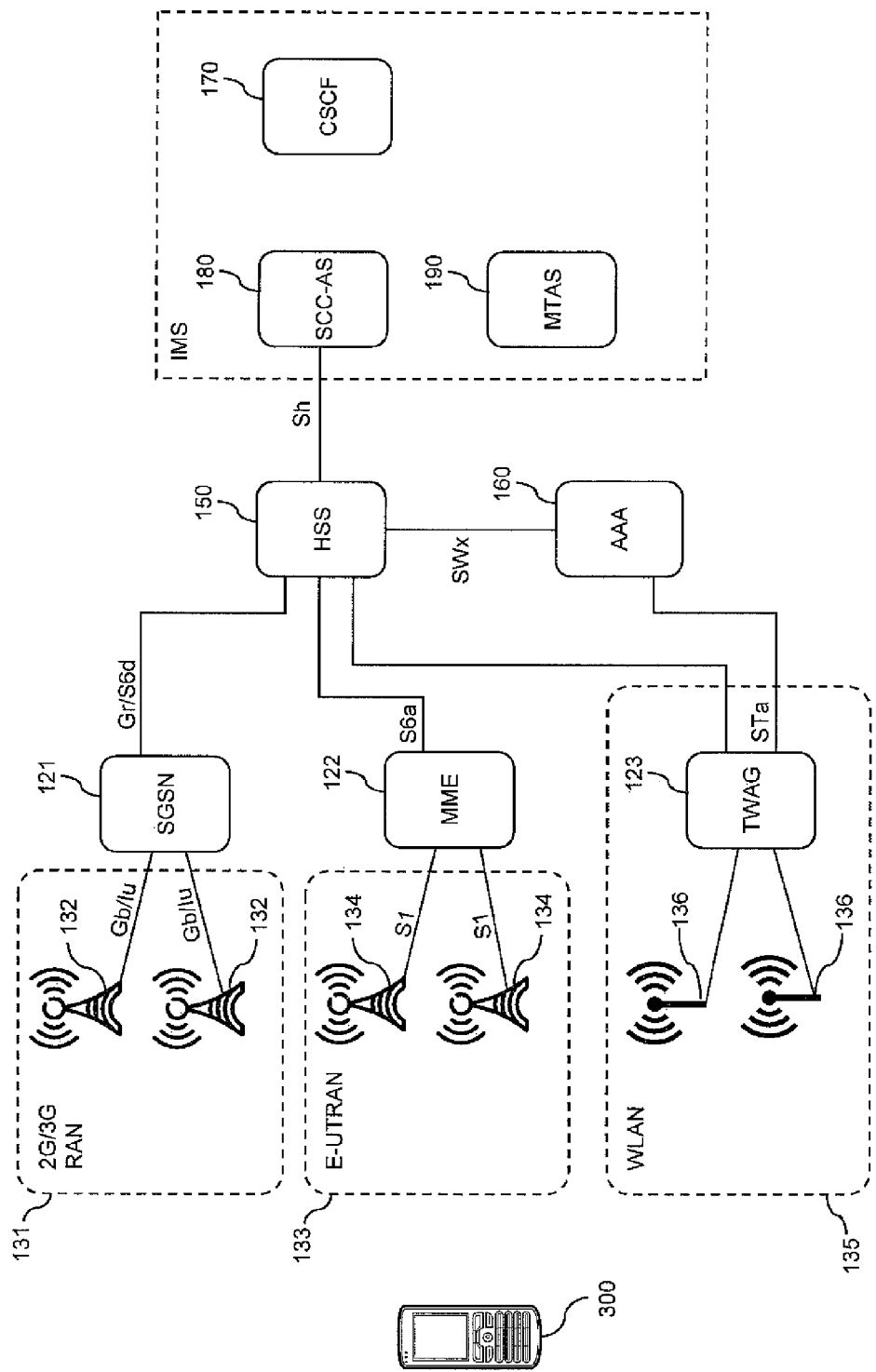
FIG. 1 schematically illustrates a mobile network architecture in which concepts according to an embodiment of the invention may be implemented.

FIG. 1 schematically illustrates a part of the mobile network architecture. In FIG. 1, 2G/3G RAN 131 is shown as an example of a 2G/3G access network providing a plurality of 2G and 3G network accesses 132, and E-UTRAN 133 is shown as an example of an LTE access network providing a plurality of LTE network accesses 134. Further, WLAN 135 is shown as an example of a WLAN access domain, which provides a plurality of WLAN accesses 136.

The PS access functionalities of the different RANs 131, 133 and of the WLAN access domain 135 are controlled by corresponding control nodes 121, 122, 123. In particular, LTE network accesses may be controlled by control nodes referred to as Mobility Management Entity (MME), and the 2G/3G access networks may be controlled by control nodes referred to as Serving GPRS Support Node (SGSN). By way of example, FIG. 1 illustrates SGSN 121 which controls the 2G/3G RAN 131 and MME 122 which controls the E-UTRAN 132. However, it should be understood that the mobile network may actually include a plurality of SGSNs for controlling the 2G/3G network accesses 132, and a plurality of MMEs for controlling the LTE network accesses 134. Typically, an SGSN, e.g., the SGSN 121, controls a plurality of 2G/3G network accesses 132 and an MME, e.g., the MME 122 controls a plurality of LTE network accesses 134. The LTE network accesses are organized in Tracking Areas (TAs), and an MME may control several of such TAs. The 2G/3G network accesses are organized in Routing Areas (RAs), and an SGSN may control several of such RAs. In some scenarios, separate control nodes having SGSN functionality may be provided for 2G and 3G RANs. Further, FIG. 1 illustrates a Trusted WLAN access gateway (TWAG) as an exemplary network node for controlling the WLAN accesses 136.

In addition, FIG. 1 illustrates additional network nodes, which are used for providing one or more services to a UE 300. Specifically, such services may include packet based voice communication as provided by the IMS. The IMS nodes illustrated in FIG. 1 include a session continuity application server 160, a call session control node 170, and other application servers, e.g., a multimedia application server 190. The call session control node 170 may be implemented as a Call Session Control Function (CSCF), which may include the Proxy CSCF (P-CSCF), the Serving CSCF (S-CSCF), and/or the Interrogating CSCF (I-CSCF) subfunctions. In the following, the call session control node 170 will also be referred to as CSCF 170. Unless described otherwise, the session continuity application server 180 may implement functionalities of an SCC AS according to 3GPP TS 23.237 V12.2.0 and 23.292 V12.1.0. Specifically, the SCC AS may implement T-ADS functionalities. In the following, the session continuity application server 180 will therefore also be referred to as SCC AS. Further functionalities of the session continuity application server 180, which are specific to the concepts as described herein, will be described below. The multimedia application server 190 may be a Multimedia Telephony Application Server (MTAS) according to 3GPP TS 24.173 V11.5.0.

Other network nodes illustrated by FIG. 1 include a subscriber database 150 and an authentication, authorization, and/or accounting (AAA) server 160. The subscriber database 150 is configured to store subscriber data. For this purpose, the subscriber database is associated with a particular subscription associated with the UE 300, e.g., by inserting a Subscriber Identity Module (SIM) card of a subscriber into the UE 300. In other words, the subscriber database 150 is a uniquely defined location for storing data relating to a particular subscriber. The subscriber database 150 may be implemented as a Home Subscriber Server (HSS) according to 3GPP TS 23.002 V12.1.0 and 23.008 V11.7.0. In the following, the subscriber database 150 will also be referred to as HSS 150. Further functionalities of the subscriber database 150, which are specific to the concepts as described herein, will be described below.

The network nodes may be coupled to each other as illustrated in FIG. 1. For this purpose, corresponding interfaces are provided between the different network nodes. For example, the MME 122 may be coupled to the LTE network accesses 134 of the E-UTRAN 133 using the S1 interface. The MME 122 may be coupled to the HSS 150 using the S6a interface. The SGSN 121 may be coupled to 2G network accesses 132 of the 2G/3G RAN 131 using the Gb interface, and the SGSN 121 may be coupled to 3G network accesses 132 of the 2G/3G RAN 131 using the Iu interface. The SGSN 121 may be coupled to the HSS 150 using the S6d interface or Gr interface. The SCC AS 160 may be coupled to the HSS 150 using the Sh interface. The AAA server 160 may be coupled to the HSS 150 using the SWx interface, and the TWAG 123 may be coupled to the AAA server 160 using the STa interface. The AAA server 160 may therefore operate as an intermediate node for connecting the TWAG 123 and the HSS 150. As further illustrated, also a direct interface between the TWAG 123 and the HSS 150 may be provided. Such direct interface may for example be implemented using the RADIUS or Diameter protocol.

The UE 300 as illustrated in FIG. 1 may be any type of mobile communication device, e.g., a mobile phone, a portable computer, or the like. It is assumed that the UE 300 is capable of using different RAT types, in particular the above-mentioned LTE access technology, 2G/3G access technology, and WLAN access technology.

In order to allow for efficiently determining whether the UE 300 is currently attached to one of the cellular network accesses 132, 134 or to one of the WLAN accesses 136, the concepts as described herein involve that the respective network nodes controlling such accesses record information concerning certain radio contact events of the UE 300 with respect to the cellular network accesses 132, 134 and the WLAN accesses 136. As used herein, the term "attached" may refer to a situation where the UE 300 has established an active PDN connection with the respective access, or to a situation in which the UE 300 is camping on the access in idle mode, without having an active PDN connection.

The above radio contact events may for example include an initial attach of the UE to one of the cellular network accesses 132, 134 or an initial attach of the UE 300 to one of the WLAN accesses. Further, the above radio contact events may include a handover from one of the cellular network accesses 132, 134 to one of the WLAN accesses 136, or a handover from one of the WLAN accesses 136 to one of the cellular network accesses 132, 134. Specifically, the time of the last radio contact event of such type may be recorded. In addition, information concerning an Access Point Name (APN) associated with such radio contact event may be recorded. The APN may identify a gateway or access point for connecting to a data network, e.g., the public Internet or the IMS. The latter information may for example indicate whether the APN is an APN provided for establishing a PDN connection to the IMS, i.e., an IMS APN. In some cases, also the APN itself could be recorded. The recorded information may then be provided to another network node, e.g., to the HSS 150 and/or to the AAA server 160, which may then evaluate the information to determine whether the UE 300 is currently attached to one of the cellular network accesses 132, 134 or to one of the WLAN accesses 136. In this connection, also the information concerning the APN may be evaluated. This may for example allow for addressing situations in which the UE 300 is attached simultaneously to one of the cellular network accesses 132, 134 and one of the WLAN accesses 136, however using different APNs. It may then be determined which access type is currently used for a specific APN, e.g., for the IMS APN.

In addition, the SGSN 121, the MME 122, and the TWAG 123 may also indicate to the HSS 150 and/or to the AAA server 160 information on capabilities supported for the UE 300 when using one of their controlled accesses. For example, the SGSN 121 may indicate whether IMS voice communication is supported for the UE 300 when using one of the 2G/3G accesses 132. Similarly, the MME 122 may indicate whether IMS voice communication is supported for the UE 300 when using one of the LTE accesses 134. The TWAG 123 may indicate whether IMS voice communication is supported for the UE 300 when using one of the WLAN accesses 136. The support may be indicated in a homogeneous manner, i.e., the SGSN 121 may indicate whether the support is present or not for all the 2G/3G accesses 132 controlled by the SGSN 121, the MME 122 may indicate whether the support is present or not for all the LTE accesses 134 controlled by the MME 122, and the TWAG 123 may indicate whether the support is present or not for all the WLAN accesses 136 controlled by the TWAG 123.

By querying the above-mentioned information from the TWAG 123 and from the SGSN 121 and/or the MME 123, the HSS 150 or AAA 160 may determine which access type is currently used by the UE 300 to establish of a PDN connection for a certain APN, and may further obtain information on supported capabilities for this access type, e.g., whether IMS voice communication is supported or not. Such information may then be provided to other network nodes, e.g., to the SCC AS 180. The SCC AS 180 may for example use this information to decide whether a voice call should be terminated via the WLAN access currently used to connect the UE 300 to the IMS, or if CS fallback should be used for this voice call.

Figure 2:
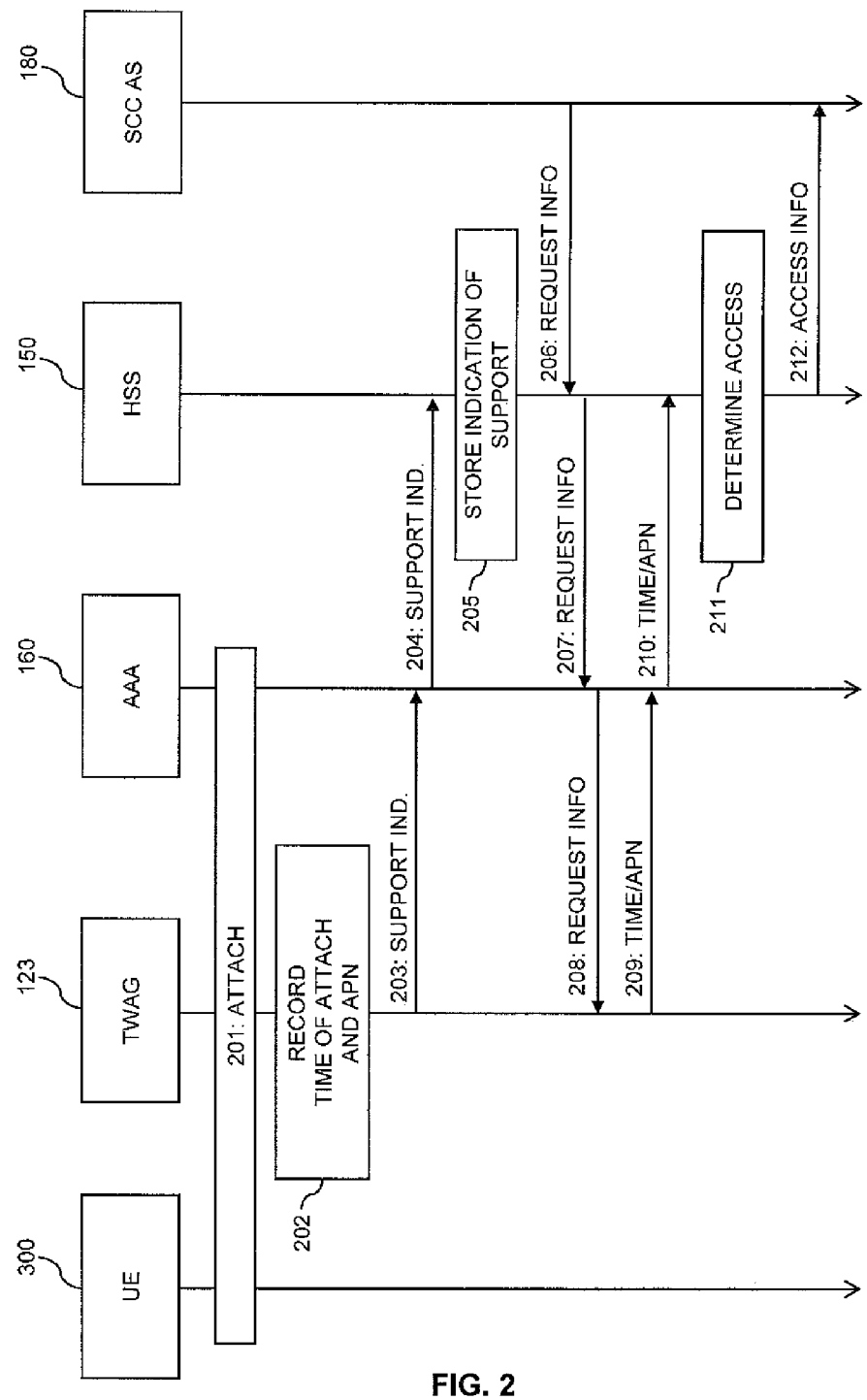
FIG. 2 shows exemplary procedures in accordance with an embodiment of the invention, in which a UE is attached to a WLAN access controlled by the mobile network.

FIG. 2 shows a signaling diagram for illustrating exemplary procedures in accordance with the above described concepts. The procedures of FIG. 2 involve the UE 300, the TWAG 123, HSS 150, the AAA server 160, and the SCC AS 180.

At step 201, the UE 300 attaches to the mobile network, using one of the WLAN accesses 136 controlled by the TWAG 123. The attachment procedure may be an initial attach, in which a PDN connection for a certain APN is newly established and an IP address is assigned to the UE 300. Alternatively, the attachment procedure may be part of a handover of the UE 300 from one of the cellular network accesses 132, 134, in which the IP address of the UE 300 which was used for the PDN connection for a certain APN via the cellular network access is preserved for the PDN connection for this APN via the WLAN access.

At step 202, the TWAG 123 records the time of the attach and typically also the APN or information on the APN. Specifically, it may be recorded whether the APN is the IMS APN or not. The time of the attach may for example be recorded in the form of a timestamp.

The TWAG 123 may then also provide a support indication 203 to the AAA server 160. The support indication 203 may for example indicate whether IMS voice communication is supported for the UE 300 when using the WLAN access for connecting to the IMS. This indication may be provided in a homogeneous manner, i.e., with respect to all WLAN accesses 136 controlled by the TWAG 123. The support indication 203 may for example be provided in the course of contacting the AAA server 160 during procedures as described in section 7.2.4 or 16.2.1 of 3GPP TS 23.402 or in section 6.1.3.7.1 of 3GPP TR 23.852, and the indication may be provided together with the signaling of such procedures.

The AAA server 160 may then forward the support indication to the HSS 150, e.g., using the SWx interface between the AAA server 160 and the HSS 150, by sending support indication 204 to the HSS 150. The HSS 150 may then store information concerning the indicated support in a data record maintained for the UE 300, as indicated by step 205.

It is now assumed, that the SCC AS 180 needs to terminate a voice call to the UE 300. The SCC AS 180 may therefore send a request 206 for support information to the HSS 150. In particular, the SCC AS 180 may request information whether IMS voice is supported for the access currently used by the UE 300. The SCC AS 180 may utilize such support information to determine whether termination of the voice call over the currently used PS access, either cellular network based or WLAN based is possible, or if the call should rather be terminated using CS fallback.

To determine the requested information, the HSS 150 may query information via the AAA 160 from the TWAG 123, using messages 207 and 208. The TWAG 123 may respond by indicating the time and optionally also the APN of the last attach by the UE 300 to one of the WLAN accesses 136 controlled by the TWAG 123. The corresponding information may be conveyed via the AAA server 160 to the HSS 150, using messages 209 and 210.

As further explained below, the HSS 150 may query similar information from other network nodes which control cellular network accesses 132, 134 potentially used by the UE 300 for establishing a PDN connection to the IMS, e.g., from the SGSN 121 and/or MME 122.

At step 211, the HSS 150 may then determine whether the PDN connection of the UE 300 to the IMS is currently established via a WLAN access or via a cellular network access. For this purpose, the time of attach for the IMS APN may be compared to each other, and the access type with the most recent recorded time selected.

By sending message 212 to the SCC AS 180, the HSS 150 may provide the SCC AS 180 with information on the currently used access type and capabilities supported for this access type, e.g., whether IMS voice communication is supported. This could be accomplished using a single information element indicating "WLAN" for the support of IMS voice communication, or could be accomplished using separate information elements for the access type and the support of IMS voice communication.

The SCC AS 180 may then use the provided information for terminating the voice call. For example, if the evaluation of step 211 indicates that the UE 300 currently uses a WLAN access for connecting to the IMS, the SCC AS 180 may decide to terminate the voice call using the WLAN access. Alternatively, a policy configured in the SCC AS 180 might prohibit termination via WLAN, and the SCC AS could select CS fallback for the termination of the voice call. Such policy could for example also be configured to allow termination via WLAN access only for certain types of voice calls, e.g., Rich Communications Suite (RCS) IP calls.

Figure 3:
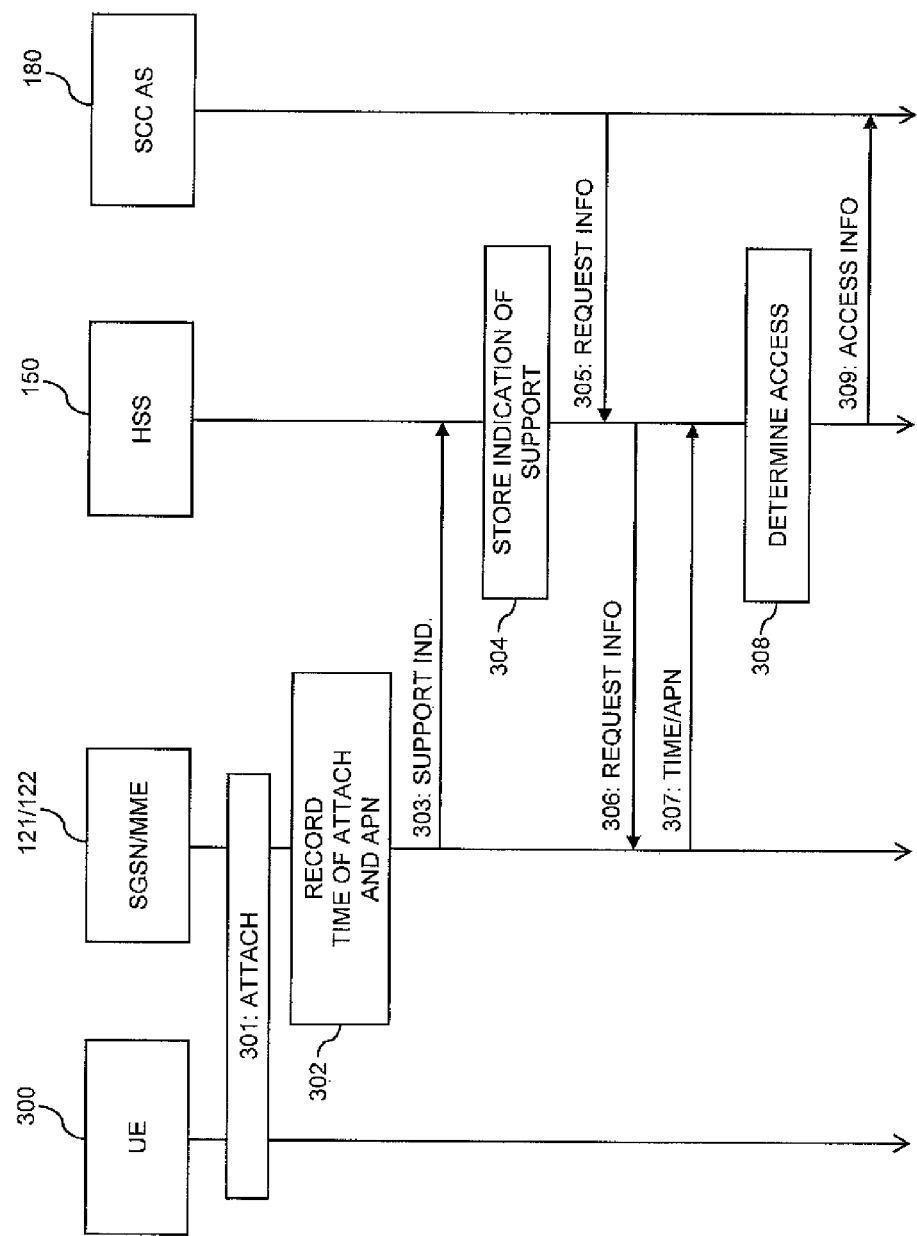
FIG. 3 shows exemplary procedures in accordance with an embodiment of the invention, in which a UE is attached to a cellular network access of the mobile network.

FIG. 3 shows a signaling diagram for illustrating exemplary procedures in accordance with the above described concepts. The procedures of FIG. 3 involve the UE 300, the SGSN 121 or MME 122, the HSS 150, and the SCC AS 180.

At step 301, the UE 300 attaches to the mobile network, using one of the cellular network accesses 132/134 controlled by the SGSN/MME 121/122. The attachment procedure may be an initial attach, in which a PDN connection for a certain APN is newly established and an IP address is assigned to the UE 300. Alternatively, the attachment procedure may be part of a handover of the UE 300 from one of the WLAN accesses 136, in which the IP address of the UE 300 which was used for the PDN connection for a certain APN via the WLAN access is preserved for the PDN connection for this APN via the cellular network access 132/134.

At step 302, the SGSN/MME 121/122 records the time of the attach and typically also the APN or information on the APN. Specifically, it may be recorded whether the APN is the IMS APN or not. The time of the attach may for example be recorded in the form of a timestamp.

The SGSN/MME 121/122 may then also provide a support indication 303 to the HSS 150. The support indication 303 may for example indicate whether IMS voice communication is supported for the UE 300 when using the cellular network access for connecting to the IMS. This indication may be provided in a homogeneous manner, i.e., with respect to all cellular network accesses 132/134 controlled by the SGSN/MME 121/122. The support indication 303 may for example be provided in the course of contacting the HSS 150 during procedures as described in section 5.3.2.1 of 3GPP TS 23.401 or section 8.2.1.1 of 3GPP TS 23.402. The indication may also be provided in the course of a RA update or a TA update. The HSS 150 may then store information concerning the indicated support in a data record maintained for the UE 300, as indicated by step 304.

It is now assumed, that the SCC AS 180 needs to terminate a voice call to the UE 300. The SCC AS 180 may therefore send a request 305 for support information to the HSS 150. In particular, the SCC AS 180 may request information whether IMS voice is supported for the access currently used by the UE 300. The SCC AS 180 may utilize such support information to determine whether termination of the voice call over the currently used PS access, either cellular network based or WLAN based is possible, or if the call should rather be terminated using CS fallback.

To determine the requested information, the HSS 150 may query information from the SGSN/MME 121/122, using messages 306. The SGSN 121/122 may respond by indicating the time and optionally also the APN of the last attach by the UE 300 to one of the cellular network accesses 132/134 controlled by the SGSN/MME 121/122. The corresponding information may be conveyed to the HSS 150 using messages 307.

As mentioned above, the HSS 150 may query similar information from other network nodes which control other network accesses potentially used by the UE 300 for establishing a PDN connection to the IMS, e.g., from the TWAG 123 which controls the WLAN accesses 136.

At step 308, the HSS 150 may then determine whether the PDN connection of the UE 300 to the IMS is currently established via a WLAN access or via a cellular network access. For this purpose, the times of attach for the IMS APN may be compared to each other, and the access type with the most recent recorded time selected.

By sending message 309 to the SCC AS 180, the HSS 150 may provide the SCC AS 180 with information on the currently used access type and capabilities supported for this access type, e.g., whether IMS voice communication is supported.

The SCC AS 180 may then use the provided information for terminating the voice call. For example, if the evaluation of step 308 indicates that the UE 300 currently uses a cellular network access for connecting to the IMS and IMS voice communication is indicated to be supported for this access, the SCC AS 180 may decide to terminate the voice call using the cellular network access.

Figure 4:
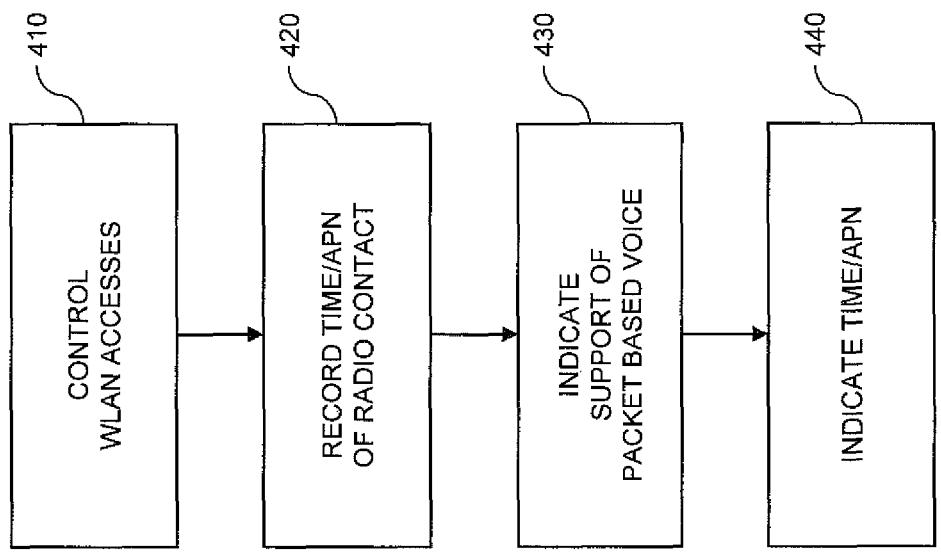
FIG. 4 shows a flowchart for illustrating a method according to an embodiment of the invention, which may be implemented by a network node responsible for controlling WLAN accesses of the mobile network.

FIG. 4 shows a flowchart for illustrating a method for controlling communication of a UE in a mobile network with cellular network accesses and WLAN accesses, e.g., using an architecture as explained in connection with FIG. 1. The method may be used for implementing the above-described concepts in a network node which controls one or more of the WLAN accesses, such as the above-mentioned TWAG 123. However, not only a TWAG may be used to implement the method, but also other types of network nodes, such as a non-trusted WLAN access gateway, a WLAN access point, or the like.

At step 410, the network node may control the one or more WLAN accesses. For example, the network node may interact with the one or more WLAN accesses and with other nodes of the mobile network to establish a PDN connection of the UE via one of the WLAN accesses. This may for example also involve authentication of the UE, e.g., using an AAA node such as the AAA server 160.

At step 420, the network node records a time of a last radio contact event of the UE with respect to a WLAN access controlled by the network node. In addition, the network node may also record information on an APN associated with the last radio contact event, e.g., in the form of the APN itself or in the form of information whether the APN corresponds to a certain type, e.g., to an IMS APN. The radio contact event may correspond to the UE attaching to the WLAN access. The radio contact event may also correspond to the UE performing a handover from a cellular network access to the WLAN access.

At step 430, the network node may indicate to a further network node whether packet based voice communication is supported for the WLAN access. Specifically, it may be indicated whether IMS voice communication over PS access is supported. The further node may for example be an AAA node, such as the AAA server 160, or may be a subscriber database, such as the HSS 150. Other supported capabilities could be indicated as well.

At step 440, the network node indicates the recorded time of the last radio contact event to a further network node. This is accomplished in response to a request from the further network node. As in step 430, the further network node may be an AAA node, such as the AAA server 160, or may be a subscriber database, such as the HSS 150. That is to say, the recorded time of the last radio contact event and the support indication of step 430 may be provided to the same further network node. This may also be accomplished in the same message. In addition, the network node may also indicate the information on the APN, as optionally recorded at step 420, to the further network node.

Figure 5:
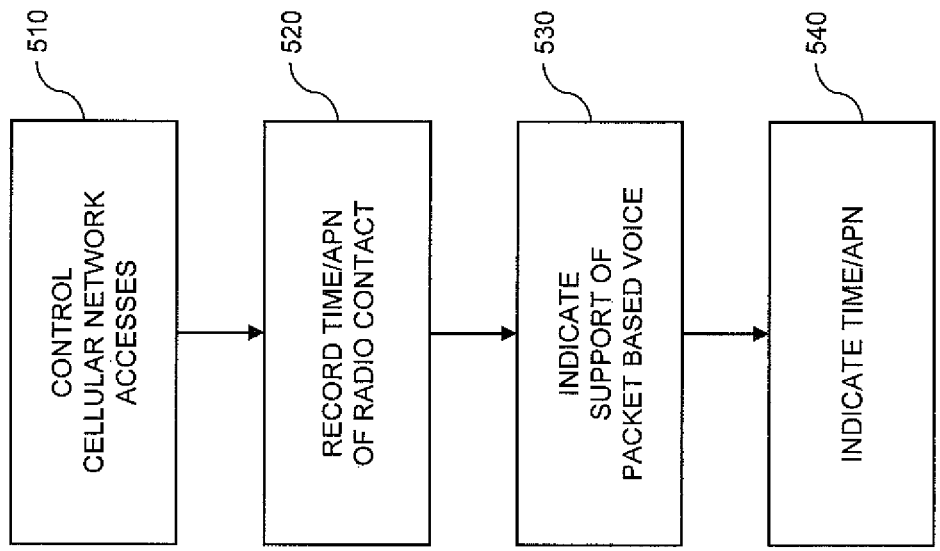
FIG. 5 shows a flowchart for illustrating a further method according to an embodiment of the invention, which may be implemented by a network node responsible for controlling cellular network accesses of the mobile network.

FIG. 5 shows a flowchart for illustrating a method for controlling communication of a UE in a mobile network with one or more cellular network accesses and one or more WLAN accesses, e.g., using an architecture as explained in connection with FIG. 1. The method may be used for implementing the above-described concepts in a network node which controls at least one of the cellular network accesses, such as the above-mentioned SGSN 121 or MME 122.

At step 510, the network node may control the at least one of the cellular network accesses. For example, the network node may interact with the at least one of the cellular network access and with other nodes of the mobile network to establish a PDN connection of the UE via one of the cellular network accesses.

At step 520, the network node records a time of a last radio contact event of the UE with respect to a cellular network access controlled by the network node. In addition, the network node may also record information on an APN associated with the last radio contact event, e.g., in the form of the APN itself or in the form of information whether the APN corresponds to a certain type, e.g., to an IMS APN. The radio contact event may correspond to the UE attaching to the cellular network access. The radio contact event may also correspond to the UE performing a handover from a WLAN access.

At step 530, the network node may indicate to a further network node whether packet based voice communication is supported for the cellular network access. Specifically, it may be indicated whether IMS voice communication over PS access is supported. The further node may for example be an AAA node, such as the AAA server 160, or may be a subscriber database, such as the HSS 150. Other supported capabilities could be indicated as well.

At step 540, the network node indicates the recorded time of the last radio contact event to a further network node. This is accomplished in response to a request from the further network node. As in step 530, the further network node may be an AAA node, such as the AAA server 160, or may be a subscriber database, such as the HSS 150. That is to say, the recorded time of the last radio contact event and the support indication of step 530 may be provided to the same further network node. This may also be accomplished in the same message. In addition, the network node may also indicate the information on the APN, as optionally recorded at step 520, to the further network node.

Figure 6:
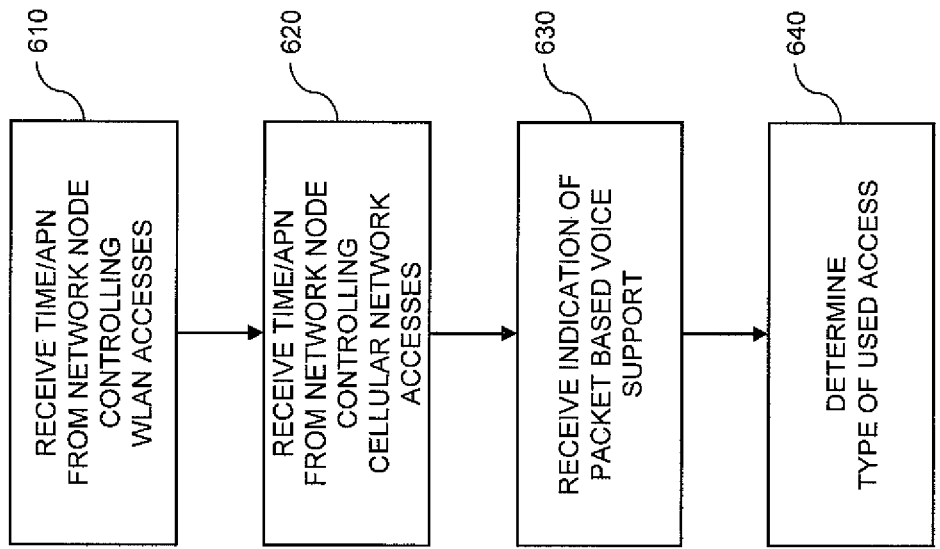
FIG. 6 shows a flowchart for illustrating a further method according to an embodiment of the invention, which may be implemented by a network node which interacts with one or more network nodes controlling WLAN accesses of the mobile network and with one or more network nodes controlling cellular network accesses of the mobile network.

FIG. 6 shows a flowchart for illustrating a method for controlling communication of a UE in a mobile network with one or more cellular network accesses and one or more WLAN accesses, e.g., using an architecture as explained in connection with FIG. 1. The method may be used for implementing the above-described concepts in a network node which interacts with a first further network node controlling at least one of the WLAN accesses, such as the above-mentioned TWAG 123, and a second further network node controlling at least one of the cellular network accesses, such as the above-mentioned SGSN 121 or MME 122. The network node implementing the method of FIG. 6 may for example be a subscriber database, such as the HSS 150, or an AAA node, such as the AAA server 160. The AAA server 160 could for example interact with the TWAG 123 using the STa interface, and could interact with the SGSN 121 or MME 122 using the SWx interface to the HSS 150 and the Gr, S6d or S6a interface from the HSS 150.

At step 610, the network node receives, from the first further network node, a time of a last radio contact event of the UE with respect to a WLAN access controlled by the first further network node. In addition, the network node may receive, from the first further network node, information on an APN associated with the radio contact event with respect to the WLAN access, e.g., in the form of the APN itself or in the form of information whether the APN corresponds to a certain type, e.g., to an IMS APN. The radio contact event may correspond to the UE attaching to the WLAN access. The radio contact event may also correspond to the UE performing a handover from a cellular network access.

At step 620, the network node receives, from the second further network node, a time of a last radio contact event of the user equipment with respect to a cellular network access controlled by the second further network node. In addition, the network node may receive, from the second further network node, information on an APN associated with the last radio contact event with respect to the cellular network access, e.g., in the form of the APN itself or in the form of information whether the APN corresponds to a certain type, e.g., to an IMS APN. The radio contact event may correspond to the UE attaching to the cellular network access. The radio contact event may also correspond to the UE performing a handover from a WLAN access.

At step 630, the network node may receive, from the first further network node, an indication whether packet based voice communication is supported for the WLAN access controlled by the first further network node. Further, the network node may receive an indication whether packet based voice communication is supported for the cellular access controlled by the second further network node. In each case, such indication may indicate whether IMS voice communication over PS access is supported.

At step 640, the network node determines a type of the access used by the UE, i.e., whether the UE is attached to a WLAN access or to a cellular network access. This is accomplished on the basis of the received times of the last radio contact event. In addition, this may be accomplished on the basis of the information on the APN, as optionally received at steps 610 and 620. The network node may then indicate, to a third further network node, information concerning the WLAN access or cellular network access to which the UE is attached. For example, the information may indicate the determined access type. In addition or alternatively, the information may indicate whether packet based voice communication is supported for the WLAN access or cellular network access to which the UE is attached, in particular whether IMS voice communication over PS access is supported.

Figure 7:
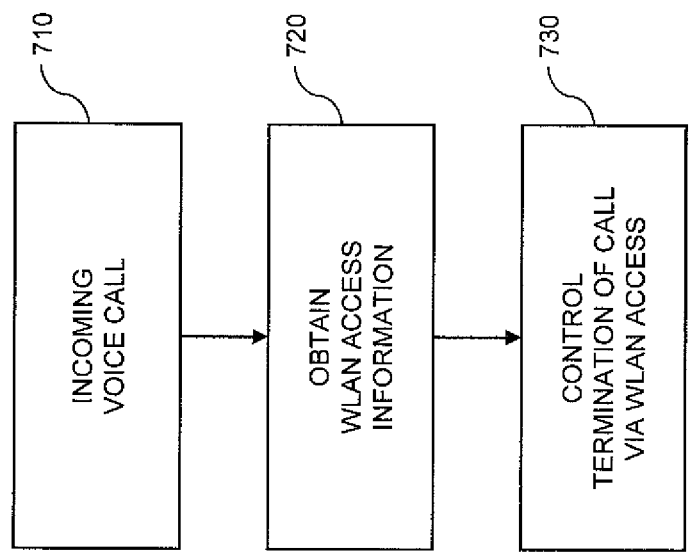
FIG. 7 shows a flowchart for illustrating a further method according to an embodiment of the invention, which may be implemented by a network node controlling provision of a certain service to a UE.

FIG. 7 shows a flowchart for illustrating a method for controlling communication of a UE in a mobile network with one or more cellular network accesses and one or more WLAN accesses, e.g., using an architecture as explained in connection with FIG. 1. The method may be used for implementing the above-described concepts in a network node which interacts with a further network node to obtain information on an access which is currently used by the UE. The network node implementing the method of FIG. 7 may for example be a network node which controls provision of at least one service to the UE, e.g., a network node which is responsible for terminating a voice call to the UE, such as the SCC AS 180. That is to say, the at least one service may include packet based voice communication. Such packet based voice communication may also be supplemented by other media components, e.g., by video in the case of a video call. The further network node may be a subscriber database, such as the HSS 150, or an AAA node, such as the AAA server 160. The SCC AS 180 could for example interact with the HSS 150 using the Sh interface, or could interact with the AAA server 160 using the Sh interface to the HSS 150 and the SWx interface from the HSS 150 to the AAA server 160.

At step 710, the network node may for example be notified of an incoming voice call or video call. However, also other kinds of events requiring control actions by the network node could occur.

At step 720, the network node receives, from the further network node, information concerning a WLAN access to which the UE is attached. The network node may receive the information in response to sending a request to the further network node. Alternatively or in addition, the network node may receive, from the further network node, information concerning a cellular network access to which the UE is attached. The received information may for example indicate whether packet based voice communication, in particular IMS voice communication over PS access, is supported for the WLAN access or cellular network access to which the UE is attached.

At step 730, the network node controls at least one service provided to the UE. This is accomplished on the basis of the information received at step 720. For example, the network node may control termination of the incoming voice call notified at step 710. If the UE is attached to both the WLAN access and the cellular network access, the network node may for example control whether to provide the at least one service via the WLAN access or via the cellular network access. In particular, the network node may control whether to terminate the voice call notified at step 710 via the WLAN access or via the cellular network access. For this purpose, the network node may be configured with a policy to decide between terminating the voice call via WLAN access and terminating the voice call via cellular network access.

Two or more of the methods as described in connection with FIGS. 4, 5, 6, and 7 may be combined with each other in a network system including two or more of the described network nodes. For example, the method of FIG. 6 could be combined with the methods of FIGS. 4 and 5. The method of FIG. 4 could then be used for providing information from the network node controlling one or more WLAN accesses (first further network node in the method of FIG. 6), and the method of FIG. 5 could be used for providing information from the network node controlling one or more cellular network accesses (second further network node in the method of FIG. 6). This information could then be handled in accordance with the method of FIG. 6. Further, the method of FIG. 6, optionally together with the method of FIG. 4 and/or 5, could be used for providing access information to be used as input in the method of FIG. 7.

Figure 8:
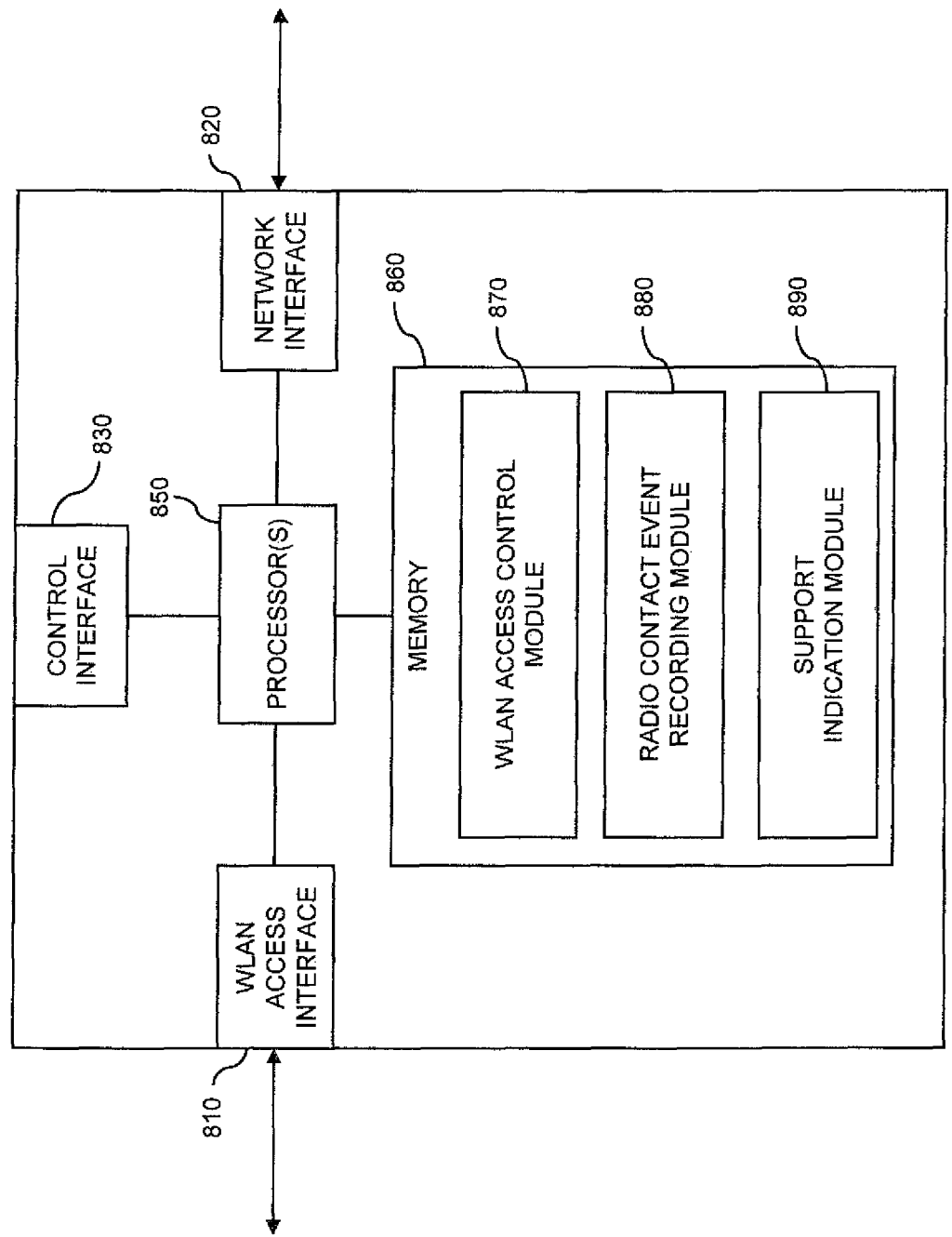
FIG. 8 schematically illustrates a network node according to an embodiment of the invention.

FIG. 8 illustrates exemplary structures for implementation of the above concepts in a network node which is responsible for controlling at least one WLAN access e.g., in the TWAG 123.

As illustrated, the network node may be provided with a WLAN access interface 810 to one or more WLAN accesses, e.g., implemented by WLAN access points. Further, the network node may be implemented with a network interface 820. In some implementations, the WLAN interface 810 and the network interface may also be used to convey user plane data of a UE connected to one of the controlled WLAN accesses. The network interface may for example correspond to the S2a, S2b or S2c interface as specified in 3GPP TS 23.402. In addition, the network node may be provided with a control interface 830 for interacting with other network nodes. For example, the control interface 830 implement the STa interface to the AAA server 160, or may implement the direct interface to the HSS 150 as illustrated in FIG. 1.

Further, the network node includes at least one processor 850 coupled to the interfaces 810, 820, 830 and a memory 860 coupled to the at least one processor 850. The memory 860 may include a read-only memory (ROM), e.g., a flash ROM, a random-access memory (RAM), e.g., a dynamic RAM (DRAM) or static RAM (SRAM), a mass storage, e.g., a hard disk or solid state disk, or the like. The memory 860 includes suitably configured program code to be executed by the processor 860 so as to implement the above-described functionalities of a network node controlling WLAN accesses. More specifically, the memory 860 may include an WLAN access control module 860 so as to implement the required functionalities for controlling WLAN accesses, e.g., establishing, modifying or releasing a PDN connection via a WLAN access or authentication of the UE. Further, the memory 860 may include a radio contact event recording module 880 so as to implement the above-described functionalities of recording the time of a radio contact event, e.g., an attach or handover, and optionally also information concerning the associated APN. Further, the memory 860 may include a support indication module 890 so as to implement the above-described functionalities of indicating supported capabilities of the UE on the WLAN access.

It is to be understood that the structures as illustrated in FIG. 8 are merely schematic and that the network node may actually include further components which, for the sake of clarity, have not been illustrated, e.g., further interfaces or additional processors. Also, it is to be understood that the memory 860 may include further types of program code modules which have not been illustrated, e.g., program code modules for implementing known functionalities of a TWAG or other WLAN node. In some implementations, also a computer program may be provided for implementing functionalities of the network node, e.g., in the form of a physical medium storing the program code and/or other data to be stored in the memory 860 or by making the program code available for download.

Figure 9:
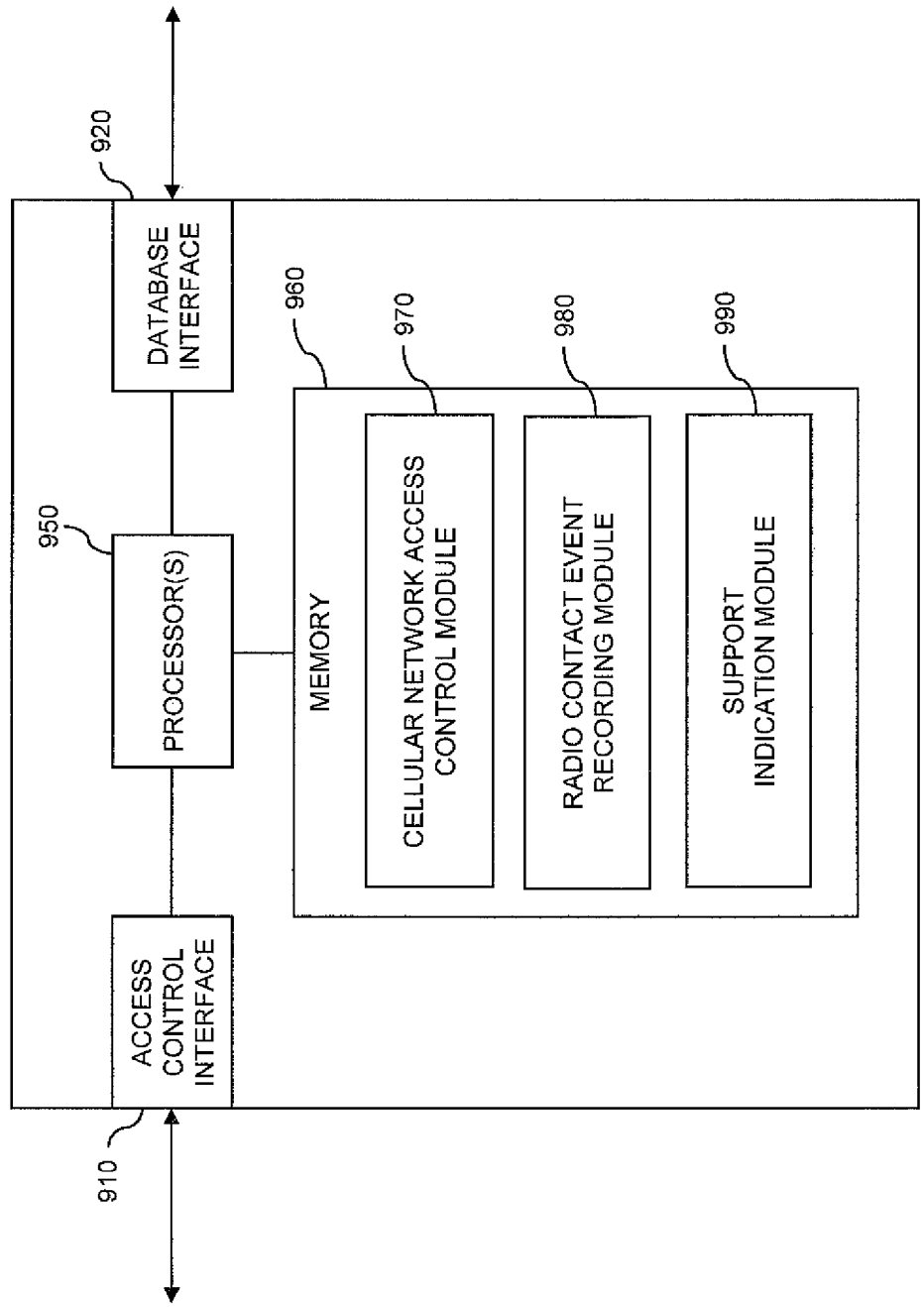
FIG. 9 schematically illustrates a network node which may be used in a system according to an embodiment of the invention.

FIG. 9 illustrates exemplary structures for implementation of the above concepts in a network node which is responsible for controlling at least one cellular network access, e.g., in the SGSN 121 or MME 122.

As illustrated, the network node may be provided with an access control interface 910 for controlling one or more cellular network accesses, e.g., implemented by GSM, UMTS, or LTE base stations. In some cases, such control may also be performed via an intermediate control node, such as a Base Station Controller (BSC) of the GSM radio access technology or a Radio Network Controller (RNC) of the UMTS radio access technology. If the network node has SGSN functionality, the access control interface 910 is with respect to 2G or 3G network accesses and may be implemented by the Gb or Iu interface, respectively. If the network node has MME functionality, the access control interface 910 is with respect to LTE network accesses, in particular eNBs, and may be implemented by the S1 interface. Further, the network node may be implemented with a database interface 920 for connecting to a subscriber database, such as the HSS 150. If the network node has SGSN functionality, the database interface 920 may be implemented as the S6d or Gr interface. If the network node has MME functionality, the database interface 920 may be implemented as the S6a interface.

Further, the network node includes at least one processor 950 coupled to the interfaces 910, 920 and a memory 960 coupled to the at least one processor 950. The memory 960 may include a ROM, e.g., a flash ROM, a RAM, e.g., a DRAM or SRAM, a mass storage, e.g., a hard disk or solid state disk, or the like. The memory 960 includes suitably configured program code to be executed by the processor 960 so as to implement the above-described functionalities of a network node controlling cellular network accesses. More specifically, the memory 960 may include a cellular network access control module 960 so as to implement the required functionalities for controlling cellular network accesses, e.g., establishing, modifying or releasing a PDN connection via a cellular network access. Further, the memory 960 may include a radio contact event recording module 980 so as to implement the above-described functionalities of recording the time of a radio contact event, e.g., an attach or handover, and optionally also information concerning the associated APN. Further, the memory 960 may include a support indication module 990 so as to implement the above-described functionalities of indicating supported capabilities of the UE on the cellular network access.

It is to be understood that the structures as illustrated in FIG. 9 are merely schematic and that the network node may actually include further components which, for the sake of clarity, have not been illustrated, e.g., further interfaces or additional processors. Also, it is to be understood that the memory 960 may include further types of program code modules which have not been illustrated, e.g., program code modules for implementing known functionalities of an SGSN or MME. In some implementations, also a computer program may be provided for implementing functionalities of the network node, e.g., in the form of a physical medium storing the program code and/or other data to be stored in the memory 960 or by making the program code available for download.

Figure 10:
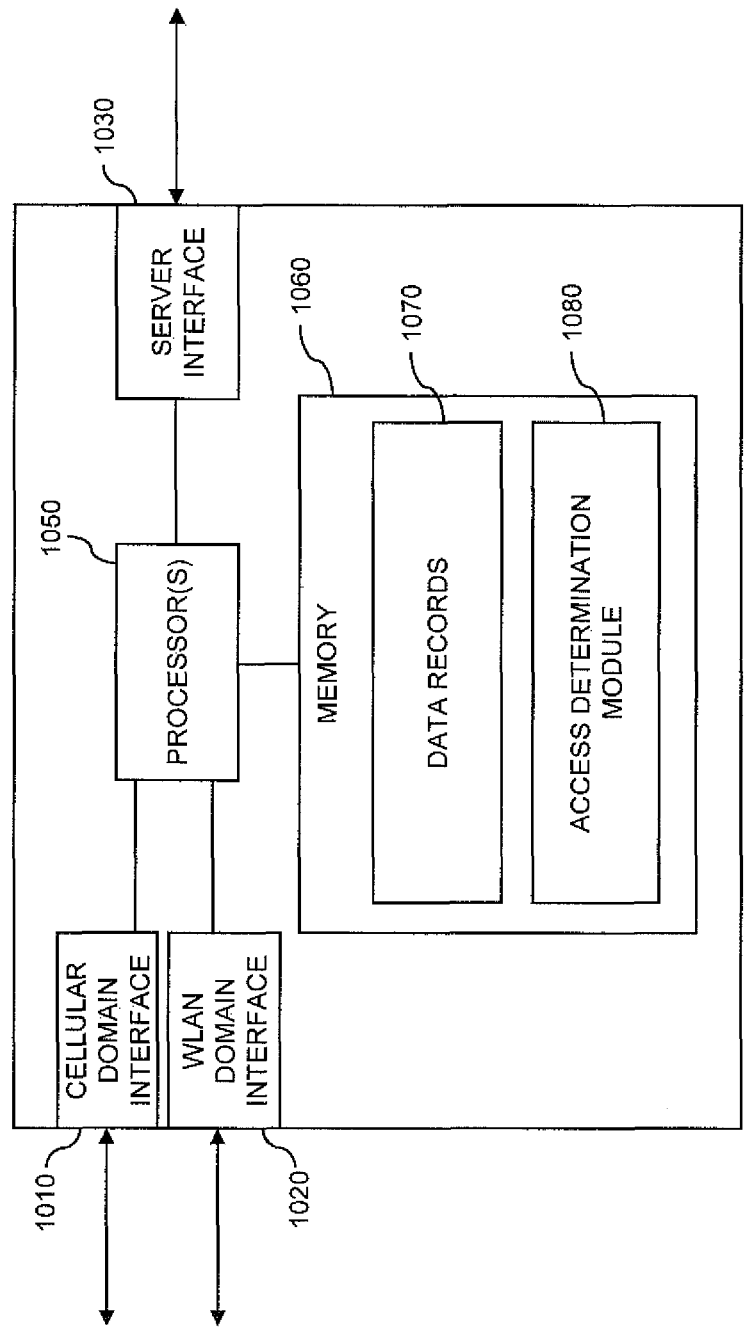
FIG. 10 schematically illustrates a network node according to a further embodiment of the invention.

FIG. 10 illustrates exemplary structures for implementation of the above concepts in a network node which interacts with a network node controlling one or more WLAN accesses and a network node controlling one or more cellular network accesses. For example, the network node may correspond to the HSS 150 or to the AAA server 160.

As illustrated, the network node may include a cellular domain interface 1010 for interacting with one or more network nodes controlling cellular network accesses, such as an SGSN or MME. If the network node implements functionalities of a HSS, the cellular domain interface 1010 may correspond to the Gr, S6d, or S6a interface. If the network node implements functionalities of an AAA server, the cellular domain interface 1010 may correspond to the SWx interface. Further, the network node includes a WLAN domain interface 1020 for interacting with one or more network nodes controlling cellular network accesses, such as a TWAG. If the network node implements functionalities of a HSS, the WLAN domain interface 1020 may correspond to the direct interface between the HSS 150 and the TWAG 123 as illustrated in FIG. 1. If the network node implements functionalities of an AAA server, the WLAN domain interface may correspond to the STa interface or SWa interface.

Further, the network node may include a server interface 1030, which has the purpose of coupling the network node to one or more servers, e.g., the SCC AS 180, or other network functions. If the network node implements functionalities of a HSS, the server interface 1030 may be implemented as the Sh interface. If the network node implements functionalities of an AAA server, the server interface may correspond to the SWx interface.

Further, the network node includes at least one processor 1050 coupled to the interfaces 1010, 1020, 1030, and a memory 1060 coupled to the at least one processor 1050. The memory 1060 may include a ROM, e.g., a flash ROM, a RAM, e.g., a DRAM or SRAM, a mass storage, e.g., a hard disk or solid state disk, or the like. The memory 1060 includes data and suitably configured program code to be executed by the processor 1060 so as to implement the above-described functionalities of the HSS 150, AAA server 160, or similar network node. More specifically, the memory 1060 may include data records 1070 related to UEs. Such data record may specifically store the indication of support of packet based voice communication with a certain UE or indication of some other supported capability. Further, the memory 1060 may include an access determination module 1080 so as to implement the above-described functionalities of determining whether the UE is attached to a WLAN access or to a cellular network access.

It is to be understood that the structures as illustrated in FIG. 10 are merely schematic and that the network node may actually include further components which, for the sake of clarity, have not been illustrated. Also, it is to be understood that the memory 1060 may include further types of data and program code modules, which have not been illustrated, e.g., program code modules for implementing known functionalities of a HSS or AAA server. In some implementations, also a computer program may be provided for implementing functionalities of the network node, e.g., in the form of a physical medium storing the program code and/or other data to be stored in the memory 1060 or by making the program code available for download.

Figure 11:
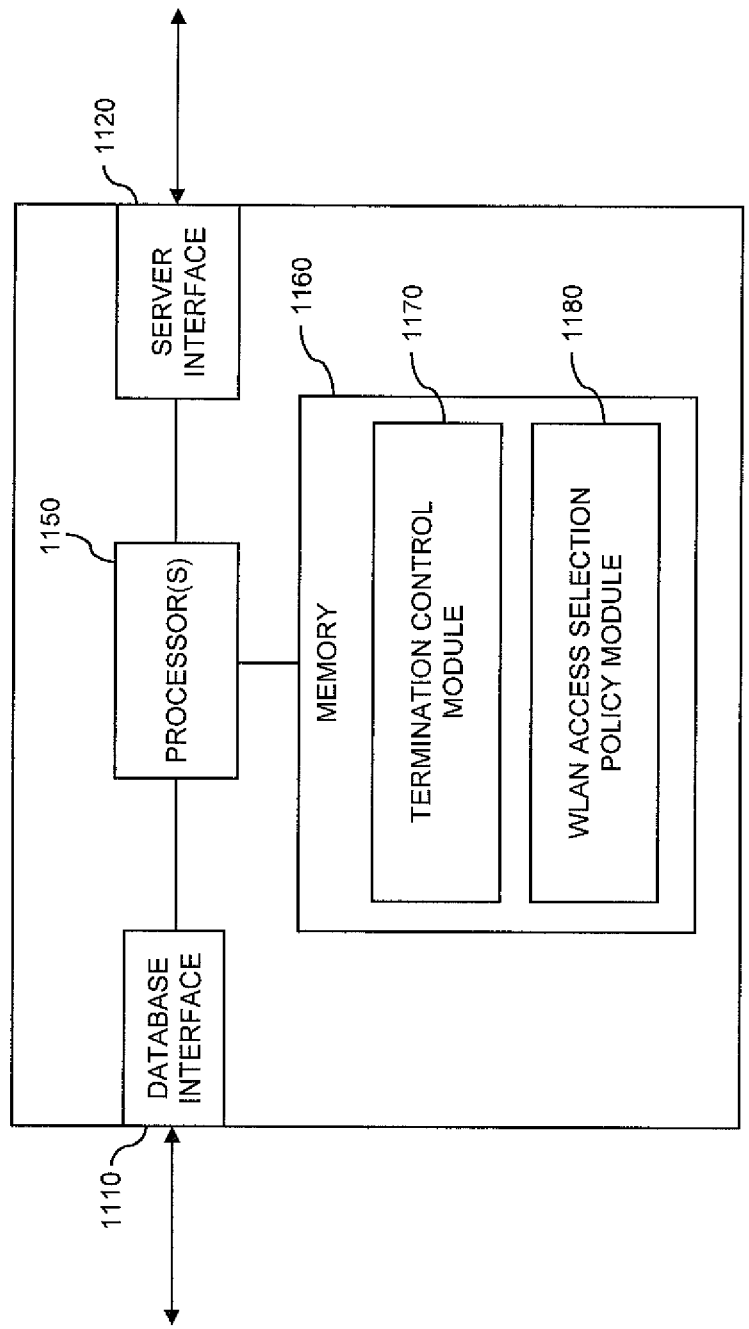
FIG. 11 schematically illustrates a network node according to a further embodiment of the invention.

FIG. 11 illustrates exemplary structures for implementation of the above concepts in a network node which is responsible for controlling provision of one or more services to a UE. For example, such service may be packet based voice communication, and the network node may be responsible for terminating voice calls or video calls, such as an SCC AS implementing T-ADS functionality. For example, the network node may correspond to the SCC AS 180.

As illustrated, the network node may include a database interface 1110 for interacting with a subscriber database, such as the HSS 150. Further, the network node may be implemented with a server interface for interacting with other network nodes, e.g., a CSCF 170 as illustrated in FIG. 1. The database interface 1110 may for example correspond to the Sh interface, and the server interface 1120 may for example correspond to the ISC interface.

Further, the network node includes at least one processor 1150 coupled to the interfaces 1110, 1120, and a memory 1160 coupled to the at least one processor 1150. The memory 1160 may include a ROM, e.g., a flash ROM, a RAM, e.g., a DRAM or SRAM, a mass storage, e.g., a hard disk or solid state disk, or the like. The memory 1160 includes data and suitably configured program code to be executed by the processor 1160 so as to implement the above-described functionalities of the SCC AS 180, or other network node controlling provision of a service to a UE. More specifically, the memory 1160 may include a termination control module 1170 so as to implement the above-described functionalities of terminating a voice call depending on information on the currently used WLAN access or cellular network access. Further, the memory 1160 may include a WLAN access selection policy module 1180 so as to implement policies for selecting a WLAN access or other access, e.g., for terminating a voice call or video call.

It is to be understood that the structures as illustrated in FIG. 11 are merely schematic and that the network node may actually include further components which, for the sake of clarity, have not been illustrated. Also, it is to be understood that the memory 1160 may include further types of data and program code modules, which have not been illustrated, e.g., program code modules for implementing known functionalities of a SCC AS. In some implementations, also a computer program may be provided for implementing functionalities of the network node, e.g., in the form of a physical medium storing the program code and/or other data to be stored in the memory 1160 or by making the program code available for download.

As can be seen, the concepts as described above may be used for efficiently handling information concerning a WLAN access used by a UE for connecting to the mobile network. For example, it can be efficiently determined whether the UE is currently using a WLAN access or a cellular network access, even if the IP address of the UE is maintained when moving between such accesses. This is specifically beneficial for IMS services, because the UE can use a single registration in the IMS. Nonetheless, the specific access type currently used by the UE may be taken into account when controlling the provision of services, such as when terminating an IMS voice call or an IMS video call.

It is to be understood that the examples and embodiments as explained above are merely illustrative and susceptible to various modifications. For example, the concepts could be used in various types of mobile network, which are based on different types or combinations of RATs. Further, it is to be understood that the above concepts may be implemented by using correspondingly designed software in existing network devices, or by using dedicated network device hardware. Also, it is to be understood that each of the illustrated nodes may be implemented as single device or by multiple interacting devices, e.g., by a device cloud or other kind of distributed system.

The invention claimed is:

1. A network node for a mobile network with at least one cellular network access and at least one wireless local area network access, the network node comprising: a first interface for interacting with a first further network node which is responsible for controlling at least one wireless local area network access of the mobile network;

a second interface for interacting with a second further network node which is responsible for controlling at least one cellular network access of the mobile network; and at least one processor, wherein the at least one processor is configured to:

receive, from the first further network node, a time of a last radio contact event of a user equipment with respect to a wireless local area network access controlled by the first further network node and information on an access point name associated with the last radio contact event with respect to the wireless local area network access;

receive, from the second further network node, a time of last radio contact event of the user equipment with respect to a cellular network access controlled by the second further network node and information on an access point name associated with the last radio contact with respect to the cellular network access;

on the basis of the received time of the last radio contact event of the user equipment with respect to the wireless local area network access and the information on the access point name associated with the last radio contact event with respect to the wireless local area network access, the received time of the last radio contact event of the user equipment with respect to the cellular network access and the information on an access point name associated with the last radio contact with respect to the cellular network access, determine whether the user equipment is attached to a certain access point via a wireless local area network access or via a cellular network access;

determine, based upon an identity of the certain access point, a supported capability that the wireless local area network access or cellular network access to which the user equipment is attached provides; and transmit information indicating the supported capability to a third further network node.

2. The network node according to claim 1,
wherein the at least one processor is further configured to:
receive, from the first further network node, an indication whether packet based voice communication is supported for the wireless local area network access.

3. The network node according to claim 1,
wherein the radio contact event with respect to the wireless local area network access corresponds to the user equipment attaching to the wireless local area network access.

4. The network node according to claim 1,
wherein the radio contact event with respect to the wireless local area network access corresponds to the user equipment performing a handover from a cellular network access to the wireless local area network access.

5. The network node according to claim 1,
wherein the radio contact event with respect to the cellular network access corresponds to the user equipment attaching to the cellular network access.

6. The network node according to claim 1,
wherein the radio contact event with respect to the cellular network access corresponds to the user equipment performing a handover from a wireless local area network access to the cellular network access.

7. The network node according to claim 1,
wherein the at least one processor is further configured to:
indicate, to a third further network node, information concerning the wireless local area network access or cellular network access to which the user equipment is attached.

8. The network node according to claim 7,
wherein the third further network node is responsible for terminating a voice call to the user equipment and the information indicates whether packet based voice communication is supported for the wireless local area network access or cellular network access to which the user equipment is attached.

9. The network node according to claim 1,
wherein the network node is a subscriber database.

10. The network node according to claim 1,
wherein the network node is an authentication, authorization, and/or accounting node.

11. A system for a mobile network with at least one cellular network access and at least one wireless local area network access, the system comprising:
a first network node;
a second network node; and
a third network node;
wherein the first network node is configured to:
record a time of a last radio contact event of a user equipment with respect to a wireless local area network access controlled by the first network node; and
in response to a request from the third network node for the time of the last radio contact event of the user equipment with respect to the wireless local area network access, indicate the recorded time of the last radio contact event with respect to the wireless local area network and information on an access point name associated with the last radio contact event with respect to the wireless local area network access to the third network node, wherein the second network node is configured to:
record a time of a last radio contact event of the user equipment with respect to a cellular network access controlled by the second network node; and
in response to a request from the third network node for the time of the last radio contact event of the user equipment with respect to the cellular network access, indicate the recorded time of the last radio contact event with respect to the cellular network access and information on an access point name associated with the last radio contact with respect to the cellular network access to the third network node,
wherein the third network node is configured to:
on the basis of the indicated time of the last radio contact event of the user equipment with respect to a wireless local area network access and the information on the access point name associated with the last radio contact event with respect to the wireless local area network access, the received time of the last radio contact event of the user equipment with respect to the cellular network access and the information on an access point name associated with the last radio contact with respect to the cellular network access, determine whether the user equipment is attached to a certain access point via a wireless local area network access or via a cellular network access;
determine, based upon an identity of the certain access point, a supported capability that the wireless local area network access or cellular network access to which the user equipment is attached provides; and
transmit information indicating the supported capability to a fourth network node.

12. The system according to claim 11, comprising:
the fourth network node,
wherein the third network node is further configured to indicate, to the fourth network node, information concerning a wireless local area network access or cellular network access to which the user equipment is attached,
wherein the fourth network node is configured to control, on the basis of the indicated information, at least one service provided to the user equipment.

13. The system according to claim 11,
wherein the radio contact event of the first network node corresponds to the user equipment attaching to the wireless local area network access.

14. The system according to claim 11,
wherein the radio contact event of the first network node corresponds to the user equipment performing a handover from a cellular network access to the wireless local area network access.

* * * * *